United States Patent [19]

Borges

[11] 3,922,006
[45] Nov. 25, 1975

[54] SELECTABLE AND HEIGHT ADJUSTABLE HITCH

[76] Inventor: Alfred Richard Borges, 25433 Feijoa, Lomita, Calif. 90717

[22] Filed: Oct. 15, 1974

[21] Appl. No.: 514,493

[52] U.S. Cl.......... 280/415 A; 280/490 R; 280/511
[51] Int. Cl.² .......................................... B60D 1/06
[58] Field of Search............ 280/415 A, 490 R, 511

[56] References Cited
UNITED STATES PATENTS

| | | | |
|---|---|---|---|
| 2,872,213 | 2/1959 | Hosford | 280/415 A |
| 3,400,949 | 9/1968 | Kendall | 280/490 R |
| 3,692,330 | 9/1972 | Kendall | 280/490 R |
| 3,717,362 | 2/1973 | Johnson | 280/415 A |
| 3,801,134 | 4/1974 | Dees | 280/415 A |

Primary Examiner—Leo Friaglia
Attorney, Agent, or Firm—Singer & Singer

[57] ABSTRACT

An adjustable hitch comprising a channeled bracket adapted to be connected to a towing vehicle. A multi-sided hitching member containing a hitch on each side is adapted to slide within said channeled bracket. A wedge interposed between the multi-sided hitching member and the channeled bracket forces a pair of keys located on the hitching member to nest within the corresponding keyways located upon the channeled bracket thereby effectively locking the hitching member to the channeled bracket. Removing the wedge and rotating the hitching member provides a selection of the different hitches and selecting a desired keyway for nesting with the keys provides a height adjustment for the selected hitch.

1 Claim, 4 Drawing Figures

SELECTABLE AND HEIGHT ADJUSTABLE HITCH

This invention relates to an adjustable hitch and more particularly to a hitch having a plurality of hitches for selection by the user and in which each of the selected hitches can be adjusted in height relative to the towing vehicle.

In the art today it is generally recognized that the most efficient technique for towing a vehicle or equipment is by means of a ball hitch. The diameter of the ball is a function of the strength of the hitch and hence is determined by the weight of the vehicle being towed; a larger vehicle requiring a larger sized diameter ball hitch then a smaller vehicle.

In the usual installation the towing vehicle and the towed vehicle are properly aligned with each other with the hitch supporting member being welded directly to the towed vehicle at the proper height above the ground as required by the towed vehicle. The art today does provide removable means in the form of locking pins for removing the ball hitch in order to satisfy certain legal requirements when not towing a vehicle.

Unfortunately, these prior art devices are located and sized on the towing vehicle and then welded in place, thereby providing a fixed relationship as determined by only one towed vehicle with respect to the towing vehicle.

In the situation where the towing vehicle is needed or required to tow a variety of different towed vehicles, there is an immediate problem in changing the ball hitches according to the requirements of the towed vehicle and, further, there is a height problem since the relationship of the towed vehicle and the towing vehicles will in every case be different.

The prior art has not recognized these problems and does not provide a reasonable solution other than having a plurality of hitches welded to the towing vehicle, each corresponding to a specific towed vehicle.

In todays mobile economy it is not unusual for a private party owning a family car to have the capability of towing a house trailer, a boat trailer, or even a small utility trailer on different occasions. Each of the towed vehicles will of necessity require a different size ball hitch and require a different height adjustment above the ground. A conventional hitch welded to the family car and sized to pull the house trailer will be improper and unsafe when used to tow the utility trailer. It will be necessary therefore for the owner of the family car to either have three different hitches which is highly impractical or, as is the usual case, he will simply change the ball on his hitch and use the same hitch to tow all three vehicles and take the risk of the unsafe towing condition.

The adjustable towing hitch described in the present invention resulted primarily from the needs of a commercial operator having the requirement to move different size towed vehicles ranging from small utility trailers to large utility trailers wherein each trailer had a different ball hitch size and a different height above ground requirement.

In this invention there is described a removable hitch member having a plurality of sides and a different ball hitch attached to each side. The hitching member is attached at one end to a substantially flat plate having the same number of sides as the hitching member. A plurality of keys are located on the flat plate and preferably are each located perpendicular to a side of the hitching member.

A channeled bracket member is fixedly attached to the towing vehicle, preferably by being welded to the frame portion of the towing vehicle. The bracket member contains a pair of spaced apart shoulder members defining a vertical passageway for accepting the flat plate containing the keys and the hitching member.

The channel members each contain a plurality of horizontal keyways spaced apart from each other by approximately one and a half inches.

The plate and hitching member assembly is inserted into the channeled bracket member between the shoulder portions depending upon which ball hitch the operator desires to use. With the selected ball hitch in the uppermost position the operator then selects the desired keyways which places the ball at the desired height above the ground as determined by the needs of the towed vehicle. Having selected the desired keyways the operator then pulls the hitching member assembly in such a fashion that the keys located upon the flat supporting plate are caused to nest with the selected keyways located on the shoulder of the channel members.

The complete assembly is locked in place by means of a wedge that is inserted behind the supporting flat plate and the channeled bracket member. The wedge will insure that the hitching member will not move in a horizontal direction, whereas the keys located within the keyway will insure that the hitching assembly does not move in a vertical direction.

The selected ball hitch is removed and changed by simply removing the wedge member and removing the flat plate hitching member and key assembly which can now move in a vertical direction for removal from the channeled bracket member.

Further objects and advantages of the present invention will be made more apparent by referring now to the accompanying drawing wherein.

Figure 1:
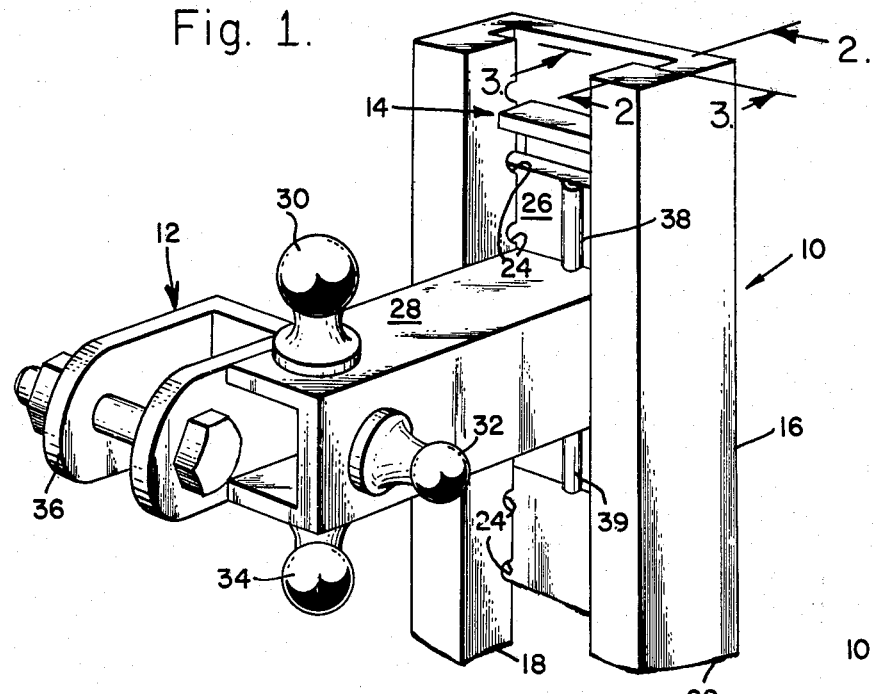
FIG. 1 is a perspective view of the complete hitch assembly and supporting structure adapted to be connected to the towing vehicle.
Figure 2:
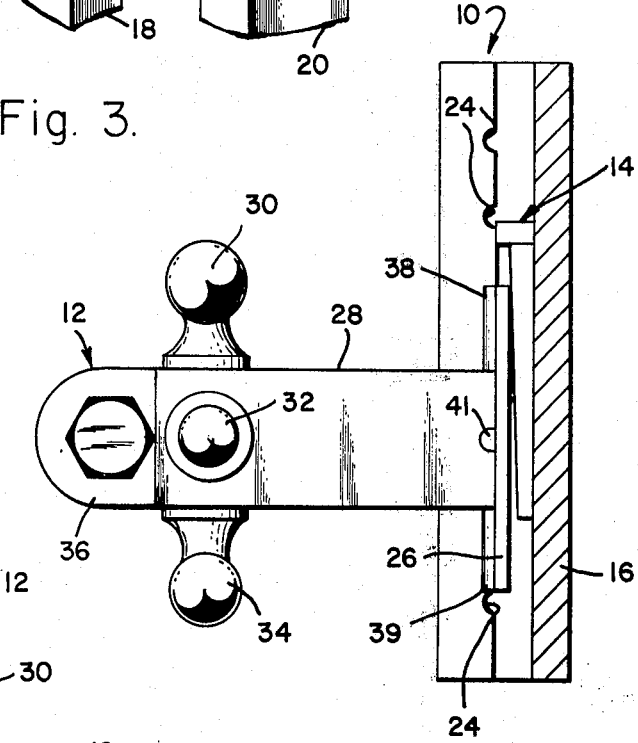
FIG. 2 is a side view and partial section taken along lines 2—2 of FIG. 1.
Figure 3:
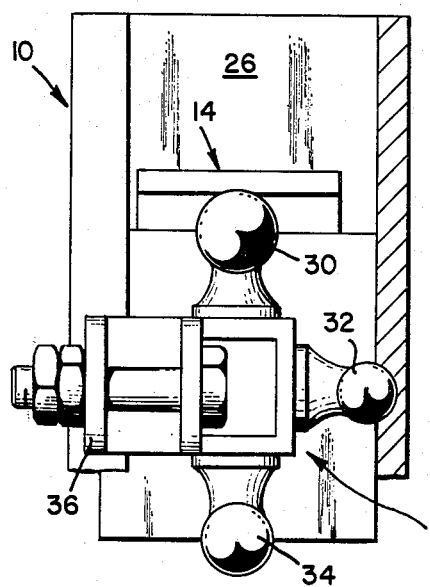
FIG. 3 is a front view and partial section taken along lines 3—3 of FIG. 1.
Figure 4:
FIG. 4 is a side view of the hitch supporting structure only.

Referring now to FIGS. 1, 2, 3 and 4, there is shown a perspective view of the complete adjustable hitch comprising a channeled bracket member 10 adapted to be connected to the towed vehicle and a hitch supporting structure 12 held within the channeled braclet member by means of a wedge member 14.

The channeled bracket member 10 is aligned vertically on the towed vehicle and fixedly attached to the towed vehicle preferably by means of welding the back portion 16 of the channeled bracket member 10 to a suitable structural member located on the towing vehicle. The channeled bracket member 10 contains a pair of shoulder portions 18 and 20 which define a slot 22 having limited access in a vertical plane only.

Each of the shoulder portions 18 and 20 contain a plurality of keyways 24 that may either be circular as shown or square or any other shape, provided only that the keyways 24 are aligned on the same horizontal plane in both shoulder portions 18 and 20.

The hitch supporting structure 12 is comprised primarily of a supporting flat plate 26 adapted to slide vertically within slot 22 and having a thickness that is approximately one-half the thickness of the slot 22 formed by shoulder portions 18 and 20.

Located on the central portion of the flat plate 26 is a box-like structure 28 having an arbitrary length and containing at the free end a plurality of different sized hitches 30, 32, 34 and 36, each located on a different surface of said box-like structure 28. In one embodiment hitch 30 comprised a 2 inch ball, hitch 32 comprised a 1-7/8 inch ball and hitch 34 comprised a 2-5/16 inch ball, with hitch 36 being of the variety commonly known as a farmer's hitch.

The exact size hitch or kind of hitch placed on the box-like structure 28 is determined solely by the needs of the user since the embodiment illustrated allows the user a choice of four different kinds of hitches.

The box-like structure 28 is located within the center of the flat plate 26 and is preferably welded to the flat plate thereby forming a rigid structure. Also located on the flat plate 26 and at right angles to the side surfaces comprising the box-like structure 28 are vertical keys 38 and 39 and horizontal keys 40 and 41. Keys 38 and 39 are aligned in the vertical plane whereas keys 40 and 41 are aligned in the horizontal plane. The individual keys 38, 39, 40 and 41 are also sized to fit within and mate with keyways 24 located within shoulders 18 and 20.

The individual keys 38, 39, 40 and 41 are securely welded to the flat plate 26 and have a thickness no greater than the thickness of the plate 26. The combination of the plate 26 and the individual keys is therefore slideable within the slot 22 formed by shoulder portions 18 and 20 since the thickness of slot 22 was previously defined as being at least twice as thick as plate 26.

The flat plate 26, including keys 38, 39, 40 and 41, is slideable within slot 22 and is properly positioned vertically as determined by the needs of the user. Once the proper height in the vertical direction is selected the horizontal keys 40 and 41 are mated with the associated keyways 24 located within shoulders 18 and 20. Mating of the keys with the keyways will cause the complete hitch supporting structure 12 to be moved in a horizontal rearward direction. In this position the wedge member 14 is inserted behind the plate 26 thereby forcibly engaging and holding the keys 40 and 41 in an engaging relationship with the keyways 24.

Relocating a given hitch to a new height location simply requires the removal of the wedge member 14 which then allows the hitch supporting structure 12 to be moved in a forward direction disengaging keys 40 and 41 from keyways 24. The hitch supporting structure is moved either up or down, determined by the needs of the user, and the process repeated with keys 40 and 41 nesting with the associated keyways 24 and the wedge member 14 again located in place to maintain the nesting position.

A review of the structure will show that any one of the four different hitches located on the hitch supporting structure may be used. Certainly if hitch 32 or the corresponding farmer's hitch 36 were to be used, then the wedge member 14 is removed and the complete hitch supporting structure 12 removed from slot 22. The hitch supporting structure 12 is then rotated 90° and the flat plate 26 again inserted within the slot 22 only in this condition keys 38 and 39 would be horizontal and would be forced to mate with associated keyways 24 once the proper height selection has been made. At that time wedge member 14 is again located in place to secure and maintain the nesting relationship between the keys and the keyways.

A review of the geometry will show that the inventive concept is not limited to a four sided structure but rather may include any even sided structure having at least four sides. The preferred embodiment contemplates only a four sided structure since experience has shown that three different ball size hitches together with the farmer hitch illustrated provides the most expeditious number and variety of hitches needed by the commercial or retail user.

I claim:

1. An adjustable hitch comprising:
   a supporting flat plate having an even number of opposing sides that is substantially symmetrical about the center of said plate,
   a hitch supporting structure fixedly attached to the central portion of said flat plate and having opposing sides paralleled to the opposing sides on said flat plate,
   a plurality of hitches each attached to one side of said hitch supporting member,
   a plurality of keys one for each side symmetrically mounted on said flat plate perpendicular to a side of said hitch supporting structure,
   a channeled bracket member for accepting said flat plate and adapted to be fixedly supported on a towing vehicle,
   said channel members having a pair of spaced apart shoulder members for accepting and limiting horizontal movement of said flat plate,
   a plurality of keyways located on said spaced apart shoulder members for nesting with opposing keys on said flat plate, and
   a removable wedge member located between said flat plate and said bracket member for maintaining said keys on said flat plate in said nesting position with said keyways on said channel members thereby preventing vertical or horizontal movement of said flat plate.

* * * * *